United States Patent
Gianakis (10) Patent No.: US 9,282,447 B2
(45) Date of Patent: Mar. 8, 2016

(54) VEHICLE INCIDENT RESPONSE METHOD AND SYSTEM

(71) Applicant: General Motors, LLC, Detroit, MI (US)

(72) Inventor: George Gianakis, Chesterfield, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/303,083

(22) Filed: Jun. 12, 2014

(65) Prior Publication Data

US 2015/0365807 A1 Dec. 17, 2015

(51) Int. Cl.
*H04M 11/04* (2006.01)
*H04W 4/22* (2009.01)
*H04W 76/00* (2009.01)
*G07C 5/00* (2006.01)

(52) U.S. Cl.
CPC ............... *H04W 4/22* (2013.01); *G07C 5/008* (2013.01); *H04W 76/007* (2013.01)

(58) Field of Classification Search
CPC ...... G06Q 50/30; G08G 1/0962; H04W 4/22; H04W 76/007
See application file for complete search history.

(56) References Cited

U.S. PATENT DOCUMENTS

| | | | |
|---|---|---|---|
| 5,933,080 A * | 8/1999 | Nojima | G08B 25/016 340/3.3 |
| 6,073,004 A | 6/2000 | Balachandran | |
| 6,680,998 B1 | 1/2004 | Bell et al. | |
| 8,036,634 B2 | 10/2011 | DiMeo et al. | |
| 2003/0109245 A1* | 6/2003 | McCalmont et al. | 455/404 |
| 2007/0243853 A1 | 10/2007 | Bumiller et al. | |
| 2008/0180237 A1 | 7/2008 | Fayyad et al. | |
| 2009/0186596 A1* | 7/2009 | Kaltsukis | 455/404.2 |
| 2011/0287733 A1* | 11/2011 | Cepuran et al. | 455/404.1 |
| 2012/0094628 A1* | 4/2012 | Mader | G08G 1/205 455/404.1 |
| 2013/0069802 A1 | 3/2013 | Foghel et al. | |
| 2014/0273915 A1* | 9/2014 | Corley et al. | 455/404.1 |

* cited by examiner

*Primary Examiner* — Khalid Shaheed
(74) *Attorney, Agent, or Firm* — Dierker & Associates, P.C.

(57) ABSTRACT

An improvement is provided to a method that detects a vehicle incident, and responds to the vehicle incident with (i) a communication to a remote advisor center that establishes a wireless connection between the remote advisor center and a vehicle associated with the vehicle incident and a conversation between an advisor at the remote advisor center and an occupant of the vehicle, and with (ii) a message to an emergency contact. With the improvement, call-in information associated with the vehicle incident is included in the message to the emergency contact. A call at the remote advisor center is received from the emergency contact using the call-in information. Information is provided by or through the call that is used to determine that the call is associated with the vehicle incident. The emergency contact is connected into the conversation between the advisor and the occupant of the vehicle.

15 Claims, 3 Drawing Sheets

VEHICLE INCIDENT RESPONSE METHOD AND SYSTEM

TECHNICAL FIELD

The present disclosure relates generally to a vehicle incident response method and system.

BACKGROUND

Vehicles may be equipped, for example, with a vehicle-incident detection system, such as, e.g., an automatic crash notification system, which may be part of a telematics control unit, an infotainment unit, or an aftermarket product. These notification systems may be operatively connected to various sensors that detect vehicle related condition(s) (e.g., angle of impact, amount of force sustained, airbag deployment, etc.). From these sensed condition(s), the automatic crash notification system is capable of deducing that the vehicle has been involved in an incident.

SUMMARY

An improvement is provided to a method that detects a vehicle incident, and responds to the vehicle incident with (i) a communication to a remote advisor center that establishes a wireless connection between the remote advisor center and a vehicle associated with the vehicle incident and a conversation between an advisor at the remote advisor center and an occupant of the vehicle, and with (ii) a message to an emergency contact. With the improvement, call-in information associated with the vehicle incident is included in the message to the emergency contact. A call at the remote advisor center is received from the emergency contact using the call-in information. Information is provided by or through the call that is used to determine that the call is associated with the vehicle incident. The emergency contact is connected into the conversation between the advisor and the occupant of the vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the system and method disclosed herein enable a vehicle or vehicle remote advisor center to automatically locate and contact an emergency contact or an "in case of emergency" (ICE) contact associated with a vehicle that has been involved in an incident. As used herein, an incident may be a vehicle accident, a vehicle crash, and/or the like. In some examples, the vehicle transmits a message to the emergency/ICE contact informing the contact of the incident and providing the contact with call-in information (e.g., a phone number) to call to receive further information. Upon calling using the call-in information, the emergency/ICE contact may also be brought into an existing conversation between an advisor at a vehicle remote advisor center and the in-vehicle occupant(s). In these instances, the emergency/ICE contact may be able to provide information about the in-vehicle occupant(s), may be able to communicate more effectively with the in-vehicle occupant(s) than the advisor on the call, may be able to aid the advisor, etc.

It is to be understood that, as used herein, the term "in-vehicle occupant" includes a vehicle owner, another authorized driver of the vehicle, or a vehicle passenger. In some examples, the in-vehicle occupant is a customer of an in-vehicle communications system service provider that operates a vehicle incident response service.

ICE contact information may be any information about the emergency or "in case of emergency" (ICE) contact. Examples of such information include name, phone number(s), address(es), relationship to the in-vehicle occupant, or any other suitable information about the ICE contact. When stored in a memory or database, the ICE information may be listed under the heading ICE or "in case of emergency contact" or "emergency contact" or another like identifier so that the ICE information can be readily retrieved from the memory or database. The ICE information may be input into the memory or database, e.g., by a vehicle user through the vehicle itself or through a website linked to a vehicle account, a mobile communications device user, or an advisor in communication with a vehicle user.

The terms "communication" and "communication link" are to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
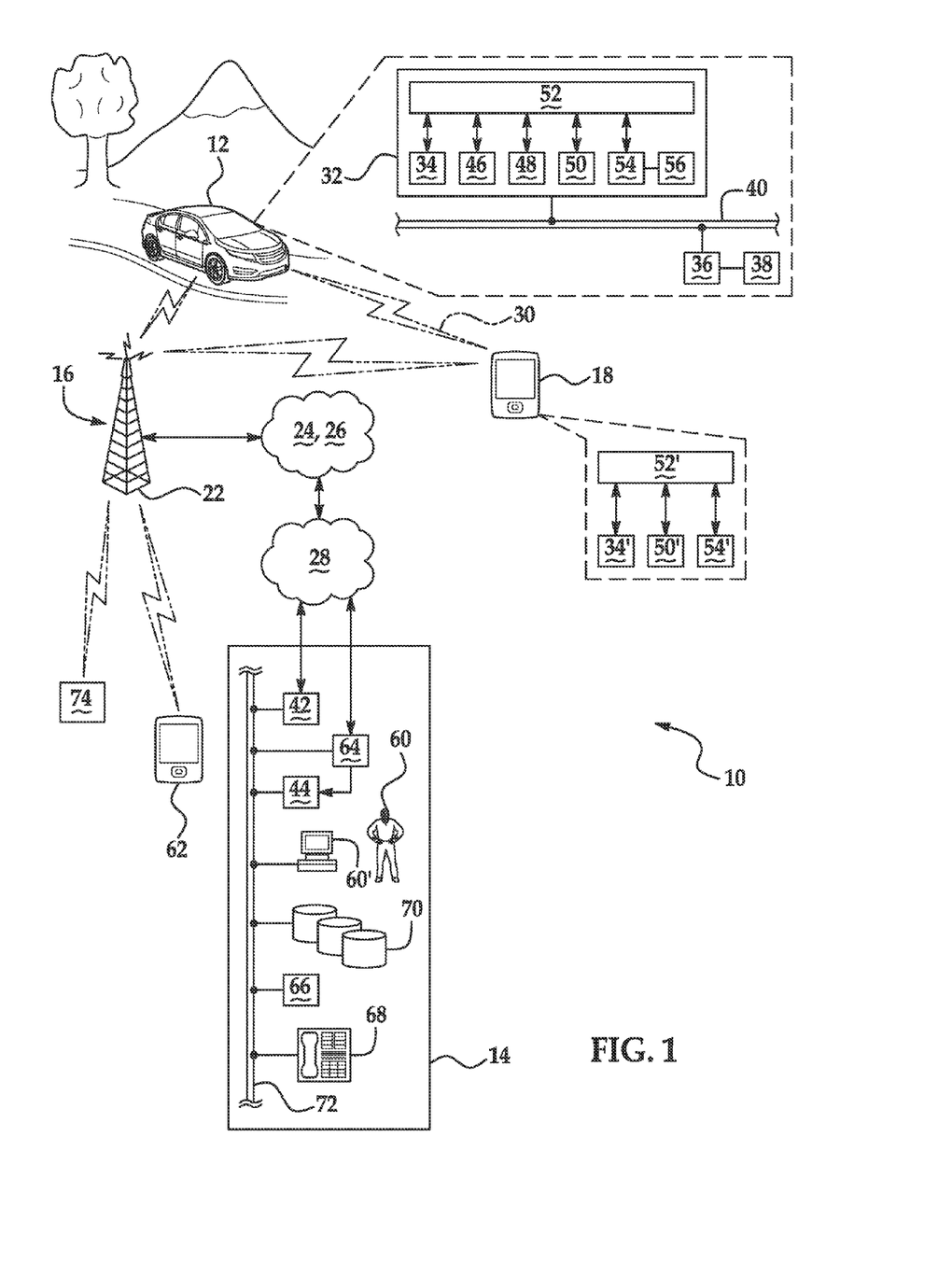
FIG. 1 is a schematic view of an example of a system for performing examples of the vehicle incident response method.

FIG. 1 depicts an example of a system 10 for performing examples of the vehicle incident response method disclosed herein. The system 10 generally includes the vehicle 12, the remote advisor center 14, the carrier/communication system 16, a mobile communications device 18 of an in-vehicle occupant, and a communications device 62 of an emergency or ICE contact.

Phone calls and/or messages (e.g., an electronic message, etc.) may be transmitted to, from, and/or between communication component(s) of the vehicle 12, communication component(s) of the remote advisor center 14, the mobile communications device 18 and/or the communications device 62 of the ICE contact using the carrier/communication system 16. In an example, the carrier/communication system 16 is a two-way radio frequency (RF) communication system. The carrier/communication system 16 may include one or more cell towers 22 or satellites (not shown). It is to be understood that the carrier/communication system 16 may also include one or more base stations and/or mobile switching centers (MSCs) 24 (e.g., for a 2G/3G network), one or more evolved Node Bs (eNodeB) and evolved packet cores (EPC) 26 (for a 4G (LTE) network), and/or one or more land networks 28. The carrier/communication system 16 may be part of a cellular radio environment or a satellite radio environment, which may include a variety of wireless network providers (which include mobile network operator(s), not shown), utilizing the same or a variety of radio access technologies. The architecture of the wireless carrier/communication system 16 may be GSM (global system for mobile telecommunications), CDMA2000, UMTS (universal mobile telecommunications system), LTE (long-term evolution), or some other available architecture.

The communication links between at least some of the various components are shown as lightning bolts in FIG. 1. Some of the communications links (e.g., between the vehicle 12 and the cell tower 22, the vehicle 12 and the mobile communications device 18, the mobile communications device 18 and the cell tower 22, the communications device 62 and the cell tower 22) are shown in phantom. This is indicative of the fact that these components may not always be able to establish a communication link with one another. Furthermore, while not shown in FIG. 1, it is to be understood that the communications device 62 of the ICE contact and/or emergency personnel 74 may be connected to the land network 28 rather than a wireless network.

In the system 10, the vehicle 12 may be a car, motorcycle, truck, or recreational vehicle (RV) that is equipped with suitable hardware and computer readable instructions/code that enable it to communicate (e.g., transmit and/or receive voice and data communications) over the carrier/communication system 16 and/or using the short range wireless communication link 30.

As shown in FIG. 1, the vehicle 12 includes an in-vehicle communications system 32. In some examples, the in-vehicle communications system 32 may be an on-board vehicle dedicated communications and entertainment device. In other examples (not shown), the in-vehicle communications system 32 is an on-board vehicle dedicated communications device, and the vehicle 12 includes a separate on-board vehicle dedicated entertainment device (e.g., an infotainment unit) that is in operative communication with the in-vehicle communications system 32. Whether integrated into a single unit (e.g., unit 32) or included as separate units, the on-board vehicle dedicated communications and/or entertainment device(s) include hardware components that are capable of running computer readable instructions/code, which are embodied on non-transitory, tangible computer readable media.

The in-vehicle communications system 32 may provide a variety of services, both individually and through its communication with the mobile communications device 18 and/or the remote advisor center 14 (e.g., a facility that may be owned and operated by an in-vehicle communications system service provider). Several examples of these services include, but are not limited to: vehicle incident response services, turn-by-turn directions and other navigation-related services provided in conjunction with a location detection based chipset/component 34; and infotainment-related services where music, Web pages, movies, television programs, videogames and/or other content is downloaded by the in-vehicle communications system 32 via a vehicle bus system 40 and an audio bus system (not shown). The listed services are by no means an exhaustive list of all the capabilities of the in-vehicle communications system 32, but are simply an illustration of some of the services that the in-vehicle communications system 32 is capable of offering.

As noted above, the in-vehicle communications system 32 may be used for vehicle communications. Some vehicle communications (e.g., between the vehicle 12 and a switch 42 or server 44 at the remote advisor center 14) utilize radio or satellite transmissions to establish a voice channel with the carrier/communication system 16 such that both voice and data transmissions may be sent and received over the voice channel. In some instances, vehicle communications are enabled through the in-vehicle communications system 32 via a communications module, which includes a cellular chipset/component 46 for voice communications and a data transmission system 48 for data transmission. In an example, the data transmission system 48 may include a packet builder, which is programmed to make decisions about what packet to send (e.g., bandwidth, data to include, etc.) and to actually build the packet data message. In another example, the data transmission system 48 may include a wireless modem, which applies some type of encoding or modulation to convert the digital data so that it can communicate through a vocoder or speech codec incorporated in the cellular chipset/component 46. It is to be understood that any suitable encoding or modulation technique that provides an acceptable data rate and bit error may be used with the examples disclosed herein. While examples have been provided, it is to be understood that any suitable data transmission system 48 may be used.

The cellular chipset/component 46 of the in-vehicle communications system 32 may be an analog, digital, dual-mode, dual-band, multi-mode and/or multi-band wireless transceiver. The cellular chipset-component 46 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), GSM™ (global system for mobile communications, which is a standard developed by the European Telecommunications Standards Institute), etc.

The in-vehicle communications system 32 may also be configured for short range wireless communication technologies, such as BLUETOOTH® and various classes thereof, dedicated short-range communications (DSRC), Wi-Fi™ and various classes thereof, or near-field communications (NFC). In these instances, the cellular chipset/component 46 may operate in conjunction with a short range wireless communication unit 50 of the in-vehicle communications system 32. As mentioned above, short range wireless communications may be suitable for communication between, for example, the vehicle 12 and the mobile communications device 18. In an example, the in-vehicle communications system 32 may be capable of retrieving ICE contact information from the mobile communications device 18 using short-range wireless communication link 30. The use of short-range wireless communication technologies will depend, at least in part, on the distance of the vehicle 12 from the mobile communications device 18. For example, when the short range wireless communication unit 50 is configured for some BLUETOOTH® connections, the short-range wireless communication unit 50 may have a preset wireless access range, or may have a standard range from about 10 meters (i.e., about 32 feet) to about 91 meters (i.e., about 300 feet).

In an example, the in-vehicle communications system 32 generally includes an electronic processing device 52 operatively coupled to one or more types of electronic memory 54, which has an in-vehicle application 56 resident thereon. In an example, the electronic processing device 52 is a microprocessor. In other examples, the electronic processing device 52 may be a micro controller, a controller, a host processor, and/or a vehicle communications processor. In another example, electronic processing device 52 may be an application specific integrated circuit (ASIC). Alternatively, electronic processing device 52 may be a processor working in conjunction with a central processing unit (CPU) performing the function of a general-purpose processor.

The electronic memory 54 of the in-vehicle communications system 32 may be an encrypted memory that is configured to store i) computer readable instructions/code of the application 56 to be executed by the processor 52, ii) data associated with the various systems of the vehicle 12 (i.e., vehicle data), and iii) vehicle user preferences and/or personal information, and/or the like. The electronic memory 54 may also temporarily or permanently store ICE contact information. The electronic memory 54 may also store the unique identifying code that can be used to establish a short range wireless communication link 30 with the mobile communications device 18.

The previously mentioned in-vehicle application 56 may be downloaded (e.g., from an online application store or marketplace) and stored on the electronic memory 54. The in-vehicle application 56 includes computer readable instructions that may run in the background and do not require in-vehicle user interaction.

The application 56 is capable of receiving information from other vehicle components. For example, the application 56 may receive an indication/notification (through the vehicle bus 40) that the incident has been sensed by a vehicle sensor 38. Examples of the vehicle sensor 38 include crash and/or collision sensors, gyroscopes, accelerometers, speed sensors, magnetometers, emission detection and/or control sensors, environmental detection sensors, vehicle heading sensors, vehicle steering angle (i.e., steering wheel position) sensors, wheel sensors, gear shift (i.e., PRNDL) status sensor, and/or the like. The sensors 38 provide information relating to vehicle-related events to the in-vehicle communications system 32 (and the application 56) via a sensor interface module 36. In an example, the crash sensors provide information regarding the severity of a vehicle collision, such as the angle of impact and the amount of force sustained. The crash sensors also provide information (e.g., in the form of signals) to the in-vehicle communications system 32 regarding any impact sustained or encountered by the vehicle 12. Impacts sustained or encountered by the vehicle 12 may include, e.g., when the vehicle 12 hits a pothole in the road or some other object, when the vehicle 12 hits another vehicle, and/or the like. In an example, the vehicle crash sensors may include rollover sensors, which are used to detect that the vehicle 12 has turned over from its normal, operating position (i.e., when all four wheels are in contact with the road) to another position (i.e., when two or no wheels are in contact with the road). Furthermore, some example sensor interface modules 36 include powertrain control, climate control, body control, and/or the like.

Referring back to the application 56, in an example, the application 56 includes computer readable instructions for retrieving ICE contact information from the memory 54 or from another memory or database accessible by the in-vehicle communications system 32. These instructions, when executed by the electronic processing device 52, may identify where the ICE information should be retrieved from. More specifically, the instructions may indicate that the processor 52 should check any of i) the mobile communications device 18 paired with the in-vehicle communications system 32, ii) the memory 54, or iii) an off-board account associated with the vehicle 12. As an example, upon recognition of a vehicle incident (through received sensor data/notification(s)), the instructions may indicate that the mobile communications device 18 paired with the in-vehicle communications system 32 should be checked for ICE information first; and if ICE information is not available from the device 18, then the memory 54 should be checked; and if ICE information is not available from the memory 54, then the off-board account should be checked. As another example, the instructions may indicate that upon first recognizing the mobile communications device 18, the processor 52 is to retrieve any ICE information from the mobile communications device 18 and temporarily store this information in the memory 54. In this other example, the instructions may also indicate i) that upon recognition of a vehicle incident, the processor 52 should retrieve the ICE information from the memory 54, and ii) that if no vehicle incident is recognized and the mobile communications device 18 is no longer recognized by the in-vehicle communications system 32, the processor 52 should delete the temporarily stored ICE information from the memory 54.

The computer readable instructions of the application 56, when executed by the electronic processing device 52, may also identify how the ICE information should be retrieved. In an example, when executing the instructions, the processor 52 may communicate with the mobile communications device 18, and request and be given access to its memory 54' (where a phone director or contact list is stored). The processor 52 may initiate a string search of the memory 54' using any suitable search term, such as "ice", "ICE, "in case of emergency," "emergency," or the like. In another example, when executing the instructions, the processor 52 may initiate a string search of the in-vehicle memory 54 using any suitable search term, such as "ice", "ICE, "in case of emergency," "emergency," or the like. In still another example, when executing the instructions, the processor 52 may communicate with the remote advisor center 14, and request and be given access to the account associated with the vehicle 12 that is stored in the database(s) 70. The processor 52 may first gain access to the vehicle's account (using vehicle identifying information stored in memory 54), and then may initiate a string search of the account information using any suitable search term, such as "ice", "ICE, "in case of emergency," "emergency," or the like.

In other examples, when executing the instructions, the processor 52 may communicate with the mobile communications device 18, the memory 54, or the remote advisor center 14, and request ICE contact information from the mobile communications device 18, the memory 54, or the remote advisor center 14. In these examples, the device 18, memory 54, or remote advisor center 14 (e.g., through server 44) initiates the search for the ICE information and transmits any information back to the processor 52.

In still some other instances, the computer readable instructions of the application 56 may instruct the processor 52 to determine whether a short range wireless connection has been made between the communications system 32 and the mobile communications device 18 before transmitting any request for ICE information. In these instances, the mobile communications device 18 may be programmed to be aware of any ICE information stored therein, and to automatically push this information to the processor 52 when the device 18 and unit 32 are connected.

The application 56 may also be programmed to generate an electronic message. In an example, the application 56 may generate the electronic message in response to the recognition that the vehicle incident has occurred and after the ICE contact information has been retrieved. Generally, the electronic message is a text message, or a short message service (SMS) message, or a multimedia messaging service (MMS) message indicating that the vehicle 12 has been involved in an incident. In the examples disclosed herein, the electronic message also includes call-in information (e.g., a contact number) that the recipient of the electronic message can call in order to receive more information about the incident and to be patched into an existing conversation (i.e., phone call) between an advisor 60, 60' at the remote advisor center 14 and the vehicle 12. The electronic message also includes a vehicle incident identifier that may be used by the recipient of the electronic message to identify the incident and vehicle 12 when he/she calls the contact number and/or that may be used by communications module 64 at the remote advisor center to patch the calling emergency contact into the appropriate existing conversation.

The call-in information or contact number that the application 56 includes in the electronic message is a phone number for the communications module 64 of the remote advisor center 14. In an example, the contact number is a (e.g., toll-free or toll) general phone number for the remote advisor center 14. This number may be a default number that is saved in the memory 54 when the application 56 is stored in the memory 54, and is accessible by the application 56. This number may be updated through a software update for the application 56. When an updated contact number is received, the updated contact number will replace any previously stored contact number.

As mentioned above, the electronic message may also include the vehicle incident identifier. The application 56 may also be programmed to retrieve some vehicle-related identification number from the memory 54, and to include this vehicle-related identification number in the electronic message as the vehicle incident identifier. Examples of the vehicle incident identifier include the vehicle identification number (VIN), the mobile dialing number (MDN of the vehicle), the remote advisor center account number for the vehicle 12, or some other ID number (e.g., a short code) that will aid a communications device (e.g., communications module 64) in identifying the incident about which the emergency contact is calling. The vehicle incident identifier may be used to identify the vehicle 12, the incident, and an existing call (e.g., between an advisor 60, 60' and the vehicle occupant(s)) to patch the subsequently calling ICE contact into. In an example, after dialing the general number, the calling ICE contact may be prompted to provide the vehicle incident identifier (e.g., the short code), which may be used by the communications module 64 to identify an appropriate existing phone call to link the ICE contact to.

The application 56 may also be programmed to generate a notification or an alert. In an example, the application 56 may generate the notification/alert in response to the transmission of the electronic message to the ICE contact. Generally, the notification/alert is a message that notifies components and advisors 60, 60' at the remote advisor center 14 that the electronic message has been sent (i.e., that the ICE contact has been contacted). The vehicle incident identifier sent to the ICE contact may also be included in the notification/alert so that the communications module 64 can link the subsequently calling ICE contact with the appropriate phone call. The alert may be sent as an electronic message over a data channel. As examples, the notification/alert may be sent as a packet data message, an SMS message, or an MMS message. In some instances, the notification/alert may be processed by the server 44 and transmitted to the advisor workstation(s) for viewing on the display.

The application 56 also includes computer readable instructions for initiating the transmission of the electronic message, and in some instances, the notification/alert. The transmission of the electronic message and the notification/alert will be discussed more in reference to FIG. 2.

As shown in FIG. 1, the in-vehicle communications system 32 may also include the location detection chipset/component 34, which may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component 34 may also include, for example, Glonass (i.e., global navigation satellite system), Sbas (i.e., satellite-based augmentation systems), or a D-GPS (differential global positioning system). The location detection chipset/component 34 may or may not be part of an in-vehicle navigation unit. These location data may be transmitted to computer equipment (e.g., processor 66) of the remote advisor center 14 for use by an advisor 60, 60', for example, in the event of a vehicle incident.

While not shown, it is to be understood that the in-vehicle communications system 32 may also include a real-time clock (RTC), a short-range wireless antenna, and/or a dual mode antenna. The real-time clock (RTC) provides accurate date and time information to the in-vehicle communications system 32 hardware and software components that may require and/or request date and time information. In an example, the RTC may provide date and time information for an ignition on event. Generally, the short-range wireless antenna services the short-range wireless communication unit 50 and the dual mode antenna services the location detection chipset/component 34 and the cellular chipset/component 46. It is to be understood that the in-vehicle communications system 32 may be implemented without one or more of the above listed components. It is to be further understood that in-vehicle communications system 32 may also include additional components and functionality as desired for a particular end use.

The communications system 32 is also operatively connected to the vehicle bus system 40. The vehicle bus system 40 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus system 40 enables the vehicle 12 to send signals (e.g., real-time bus messages, alerts/notifications) from the communications system 32 (and application 56 resident on the memory 54) to various units of equipment and systems both outside the vehicle 12 and within the vehicle 12. The vehicle bus system 40 also enables the vehicle 12 to receive signals at the communications system 32 from various units of equipment and systems both outside the vehicle 12 and within the vehicle 12 (e.g., from crash and/or collision and other in-vehicle sensors 38).

The in-vehicle communications system 32 may also include an audio component that receives analog information, rendering it as sound, via an audio bus system (not shown). Digital information may be received at the communications system 32 via the vehicle bus system 40. The audio component may provide AM and FM radio, high-definition radio, satellite radio, CD, DVD, multimedia, and other like functionality, in conjunction with the controller/processor 52 of the communications system 32. The communications system 32 may contain a speaker system, or may utilize vehicle speaker(s) (not shown) via arbitration on vehicle bus system 40 and/or audio bus system.

As illustrated in FIG. 1, in some examples, the system 10 also includes the mobile communications device 18. In an example, the mobile communications device 18 may be a smart phone, such as a GSM/LTE phone or a GSM/CDMA/LTE phone. In other examples, the mobile communications device 18 may be any portable device that has at least a short range wireless communication unit 50'. Examples of other mobile communications devices 18 include a tablet computer, a laptop computer, etc., each of which may be, for example, GPS and BLUETOOTH®, Wi-Fi™, NFC, etc. enabled. The mobile communications device 18 may also include a location detection based chipset/component 34'.

In addition to the short range wireless communication unit 50', the mobile communications device 18 may also include physical hardware (e.g., a micro-processor 52') and computer readable instructions stored in a memory 54'. The microprocessor 52' of the mobile communications device 18 may be similar to processor 52, and is capable of executing the computer readable instructions stored in the memory 54'.

Some examples of the mobile communications device 18 may include a wireless communications module, which, in addition to the short range wireless communication unit 50', also includes a cellular chipset/component for voice communications and a wireless modem for data transmission. In these examples, the mobile communications device 18 is capable establishing short range wireless connections and is also capable of making cellular or satellite connections (over the wireless carrier/communication system 16).

In the examples disclosed herein, the in-vehicle occupant may take his/her mobile communications device 18 into the vehicle 12. The short range wireless communication units 50, 50' may be used to connect the device 18 with the communications system 32 (and the application 56). For example, when the mobile communications device 18 is paired with the communications system 32 and is within a range suitable for establishing the short range wireless communication link 30, the mobile communications device 18 may be programmed to give access to the application 56 so that ICE contact information can be transferred from the memory 54' to the in-vehicle memory 54. For another example, when the mobile communications device 18 is paired with the communications system 32 and is within a range suitable for establishing the short range wireless communication link 30, the mobile communications device 18 may be programmed to push ICE contact information to the application 56 for temporary storage in the memory 54.

The push of ICE contact information from the mobile communications device 18 to the application 56 may occur as soon as the units 50, 50' recognize one another (which may, e.g., occur before any vehicle incident). The retrieval of ICE contact information from the mobile communications device 18 by the application 56 may occur as soon as the units 50, 50' recognize one another (which may, e.g., occur before any vehicle incident), or after the application 56 has been made aware of a vehicle incident. If the mobile communications device 18 pushes ICE contact information or the application 56 retrieves ICE contact information as soon as the units 50, 50' recognize one another, this information may be temporarily stored in the memory 54 and used in the event that an incident occurs. The timing of any attempt to retrieve any ICE contact information from the mobile communications device 18 may depend upon the programming of the application 56.

It is to be understood that the mobile communications device 18 has a unique identifying code (e.g., a wireless connection key) that is used to pair the device 18 with the communications system 32 of the vehicle 12 (e.g., over short range wireless communication link 30). The mobile communications device 18 and the communications system 32 are paired when the respective units 50, 50' exchange unique identifying codes with each other. This enables the device 18 and system 32 to communicate typically under a secured connection. As a more specific example, initial pairing may involve setting the mobile communications device 18 to a short range wireless discovery mode (such as by selecting, on the device 18, a discovery mode function as a menu option, icon, or the like). While in the discovery mode, other devices having a short range wireless communication unit (such as the communications system 32) are allowed to detect the presence of the mobile communications device 18. When the communications system 32 locates the mobile communications device 18, the mobile communications device 18 automatically provides the type of device it is (e.g., a smart phone, a tablet computer, a laptop computer, etc.) and its short range wireless connection name. The mobile communications device 18 may then prompt the user to enter a security code/password, and then the unique identifying code of the mobile communications device 18 is sent to the communications system 32. Upon receiving the unique identifying code, the communications system 32 sends its own unique identifying code to the mobile communications device 18 to ultimately pair the two devices 18, 32 together.

Once the device 18 and system 32 have been paired and whenever within short range wireless communication range of each other, the mobile communications device 18 can directly communicate with the communications system 32. This communication may be desirable, for example, so that ICE contact information for an in-vehicle occupant is available to the application 56.

Since more than one occupant may be present in the vehicle 12, it is to be understood that the communications system 32 may be able to establish the short range communication link 30 with multiple devices 18. The unique identifying code enables the communications system 32 to identify the device 18. The device information may enable the communications system 32, or the advisor 60, 60' at the remote advisor center 14, or the ICE contact to identify the vehicle occupant. For example, a vehicle owner may have his family members' names and mobile phone numbers stored in the vehicle profile at the remote advisor center 14. When an incident occurs, the alert/notification that is transmitted from the vehicle 12 to the remote advisor center 14 may also identify any mobile communications devices 18 that are then-currently communicate with the communications system 32. The mobile communications device information may be cross-checked with the profile to potentially identify the in-vehicle occupants during the incident.

As mentioned above, the system 10 also includes the remote advisor center 14. In the examples disclosed herein, the owner of the vehicle 12 is a customer of the communications system service provider that operates the remote advisor center 14, and thus components of the remote advisor center 14 are in selective communication with the vehicle 12. The remote advisor center 14 is capable of communicating with the communications system 32 when the vehicle 12 is within the coverage area of the carrier/communication system 16.

The remote advisor center 14 includes a server 44. The server 44 is a system of computer hardware and computer readable instructions that is capable of responding in a number of ways to request(s) and/or message(s) transmitted from the vehicle 12. For example, in response to receiving a request for ICE contact information from the processor 52 of the in-vehicle communications device 32, the server 44 may automatically provide the processor 52 with access to the account associated with the vehicle 12 or retrieve the requested information from the account. The remote advisor center server 44 may identify the vehicle 12 from which the request is being received through the mobile dialing number, vehicle identification number, etc. that is transmitted in a header of the request. The remote advisor center server 44 may include computer readable instructions for locating (in the database 70) the account associated with the vehicle 12, and for looking up or allowing the processor 52 to automatically look up any emergency contact information that may be saved in the associated account. If the emergency contact information is located, the server 44 may be programmed to allow the retrieved emergency contact information to be copied and transmitted to the application 56 in the vehicle 12.

The remote advisor center server 44 may be configured to receive information (e.g., the notification) from the communications system 32 in the form of an electronic message (e.g., packet data, SMS or MMS message, etc.). In this example, a communications module 64 receives the electronic message from the communications system 32. Upon receiving the electronic message, the communications module 64 analyzes the message and any data contained therein, and transmits the message and/or data to the server 44. The server 44 includes software (to be run by processor 66 or another processor associated with the server 44) that is capable of performing one or more of actions of the method disclosed herein.

The server 44 may also be capable of receiving the notification/alert from the in-vehicle communications system 32. As discussed above, in some examples of the method, the notification/alert may include a general message indicating that the vehicle 12 has been involved in an incident and that an ICE contact has been sent the electronic message. The remote advisor center server 44 may identify the vehicle 12 through the mobile dialing number, vehicle identification number, etc. that is transmitted in a header of the notification/alert. In other examples of the method, the notification/alert may include a general message indicating that the vehicle 12 has been involved in an incident.

In some examples, upon receiving the notification/alert, the server 44 may forward the notification/alert to an available live advisor 60 or an automated advisor 60', who/which is then assigned to assist the vehicle 12. When the notification/alert includes the vehicle incident identifier, the server 44 may also be programmed to forward the vehicle incident identifier to the workstation of the appropriate advisor(s) 60 and/or to the automated advisor 60'.

The live advisor 60 may receive the notification/alert at his/her advisor workstation or communications device, which includes telecommunications and computing equipment 68. The telecommunications and computing equipment 68 may include a phone and a computer (having processor 66). The automated advisor 60' is operated by a processor of the computing equipment 68, and thus may directly receive the notification/alert. In response to receiving the notification/alert, the live advisor 60 may, or the automated advisor 60' may be programmed to initiate a phone call with the communications device 32 of the vehicle 12. In initiating this call, the live advisor 60 or the automated advisor 60' may use the vehicle incident identifier as a passcode for patching other caller(s) into the call between the vehicle 12 and the live advisor 60 or the automated advisor 60'. The vehicle incident identifier may be provided to the communications module 64 or may be available to (or retrievable by) the communications module 64 so that the communications module 64 can link a calling ICE contact with the appropriate ongoing call.

Alternatively, if the vehicle 12 initiates the call to the advisor 60, 60' after recognizing the incident, this call may include the vehicle incident identifier that was sent from the vehicle communications device 32 to the ICE contact's communications device 62. The advisor 60, 60' can then associate the vehicle incident identifier with the call between the advisor 60, 60' and the vehicle 12 so that the communications module 64 can link a calling ICE contact with the appropriate ongoing call using the vehicle incident identifier.

As alluded to above, the remote advisor center server 44 may include computer readable instructions that initiate the transmission of the notification/alert to a remote advisor center advisor 60 or 60'. In an example, the notification/alert is transmitted as a message that will be displayed on the workstation of the advisor(s) 60. As an example, the message may inform the advisor 60 of the status of the ICE contact. For example, the message may indicate that the vehicle 12 or the remote advisor center 14 has sent the electronic message to the ICE contact, that the message was successfully transmitted, and that the ICE contact may be calling. For another example, a message may be displayed as one color (grey) indicating that the electronic message has been sent (from the communications system 32 or the communications module 64) to the ICE contact but that confirmation as to the successful transmission of the electronic message is pending. The vehicle communications system 32 or the communications module 64 may follow up regarding the transmission of the electronic message, and the message may then be displayed as another color (e.g., green) if the transmission is successful or yet another color (e.g., red) if the transmission is unsuccessful. This allows the advisor 60 to be informed as to when the ICE may be calling, and that if a call with the vehicle 12 is not in progress, that he/she should initiate a call to the vehicle 12. If the transmission is unsuccessful, the vehicle communications system 32 or the communications module 64 may resend the electronic message on its own, or the server 44 may prompt the vehicle communications system 32 or the communications module 64 to resend the electronic message to the device 62 of the ICE contact.

The remote advisor center processor 66, which is often used in conjunction with telecommunication and computer equipment 68, is generally equipped with suitable software and/or programs enabling the processor 66 (and remote advisor center server 44) to accomplish a variety of remote advisor center functions. Further, the various operations of the remote advisor center 14 may be carried out by one or more computers (e.g., computer equipment 68) programmed to carry out some of the tasks of the remote advisor center 14. The telecommunication and computer equipment 68 (including computers) may include a network of servers (including server 44) coupled to both locally stored and remote databases (e.g., database 70) of any information processed.

The remote advisor center 14 also includes switch(es) 42. The switch 42 may be a private branch exchange (PBX) switch. The switch 42 routes incoming signals so that voice transmissions are usually sent to either the live advisor 60 or the automated response system 60', and data transmissions are passed on to a modem or other piece of equipment (e.g., communications module 64) for demodulation and further signal processing. The modem preferably includes an encoder, as previously explained, and can be connected to various devices such as the server 44 and database 70.

When the switch 42 receives a call (voice transmission) on a line associated with the call-in information, the switch 42 is programmed to route the call to the communications module 64. The communications module 64 may be a dedicated vehicle incident response system. In one example, the communications module 64 is programmed to request (e.g., through a pre-recorded prompt) the vehicle incident identifier from the caller, and to use the vehicle incident identifier to patch the caller into an existing (already ongoing) conversation between the advisor 60, 60' and the in-vehicle occupant(s) without pausing, holding, or otherwise interrupting the existing wireless connection. In another example, the communications module 64 is programmed to recognize the vehicle incident identifier as part of the caller identification information that is transmitted with the call, and to use the vehicle incident identifier to patch the caller into an existing (already ongoing) conversation between the advisor 60, 60' and the in-vehicle occupant(s) without pausing, holding, or otherwise interrupting the existing wireless connection.

Since the vehicle incident identifier has previously been linked to an existing phone call (e.g., by the advisor 60, 60' on the call), the communications module 64 may be programmed to use the vehicle incident identifier to identify the existing phone call and to link the emergency contact caller into the existing phone call. In an example, the vehicle incident identifier acts as a passcode for the communications module 64 to seamlessly link the two phone calls.

As previously mentioned, the remote advisor center 14 also includes the live and/or automated advisors 60, 60'. Each advisor 60, 60' may be associated with a workstation, including telecommunication and computer equipment 68. When transmissions from the server 44 are received by the telecommunication and computer equipment 68 of the live advisor 60, the computer equipment 68 may be programmed to notify the live advisor 60 of the transmission via an on-screen alert. The live advisor 60 may then use his/her computer equipment 68 and/or phone to respond or perform some action. For example, the live advisor 60 may initiate a phone call with the vehicle 12, may initiate a search of the database 70 for ICE contact information, etc.

The database(s) 70 at the remote advisor center 14 may be designed to store vehicle record(s), subscriber/user profile records, or any other pertinent subscriber and/or vehicle information. In an example, the database(s) 70 may be configured to store the user profile, which may contain personal information of the subscriber (e.g., the subscriber's name, garage address, billing address, home phone number, cellular phone number, etc.), as well as the user's in case of emergency (ICE) contact information (e.g., the contact's name, home phone number, cellular phone number, etc.). It is to be understood that the databases 70 may allow the remote advisor center 14 to function as a repository for data collected from the vehicle 12 and/or from the vehicle owner/driver. In some instances, another facility may function as a repository for collected data (e.g., a lab (not shown) associated with the remote advisor center 14 whose database(s) the server 44 or advisors 60, 60' can access).

As illustrated in FIG. 1, the various remote advisor center components are coupled to one another via a network connection or bus 72, such as one similar to the vehicle bus 40 previously described.

It is to be appreciated that the remote advisor center 14 may be any central or remote facility, manned or unmanned, mobile or fixed, to or from which it is desirable to exchange voice and data communications. As such, the live advisor 60 may be physically present at the remote advisor center 14 or may be located remote from the remote advisor center 14 while communicating therethrough.

The remote advisor center 14 shown in FIG. 1 may also be virtualized and configured in a Cloud Computer, that is, in an Internet-based computing environment. For example, the computer equipment 68 may be accessed as a Cloud platform service, or PaaS (Platform as a Service), utilizing Cloud infrastructure rather than hosting computer equipment 68 at the remote advisor center 14. The database 70 and server 44 may also be virtualized as a Cloud resource. The Cloud infrastructure, known as IaaS (Infrastructure as a Service), typically utilizes a platform virtualization environment as a service, which may include components such as the processor 66, database 70, server 44 and computer equipment 68. In an example, some of the self-reported tracking software and services disclosed herein may be performed in the Cloud via the SaaS (Software as a Service). For example, received alert notifications and/or trip plans may be acted upon by the server 44 in conjunction with the automated advisor 60', which may be configured as a service present in the Cloud.

As mentioned above, the system 10 shown in FIG. 1 enables the vehicle 12 and/or the remote advisor center 14 to assist an in-vehicle occupant in the event of a vehicle incident. Different examples of the vehicle incident response method 200 and 300 are shown, respectively, in FIGS. 2 and 3. It is to be understood that various components of the system 10 of FIG. 1 may be referenced throughout the discussion of FIGS. 2 and 3, but may not be shown in FIGS. 2 and/or 3.

Figure 2:
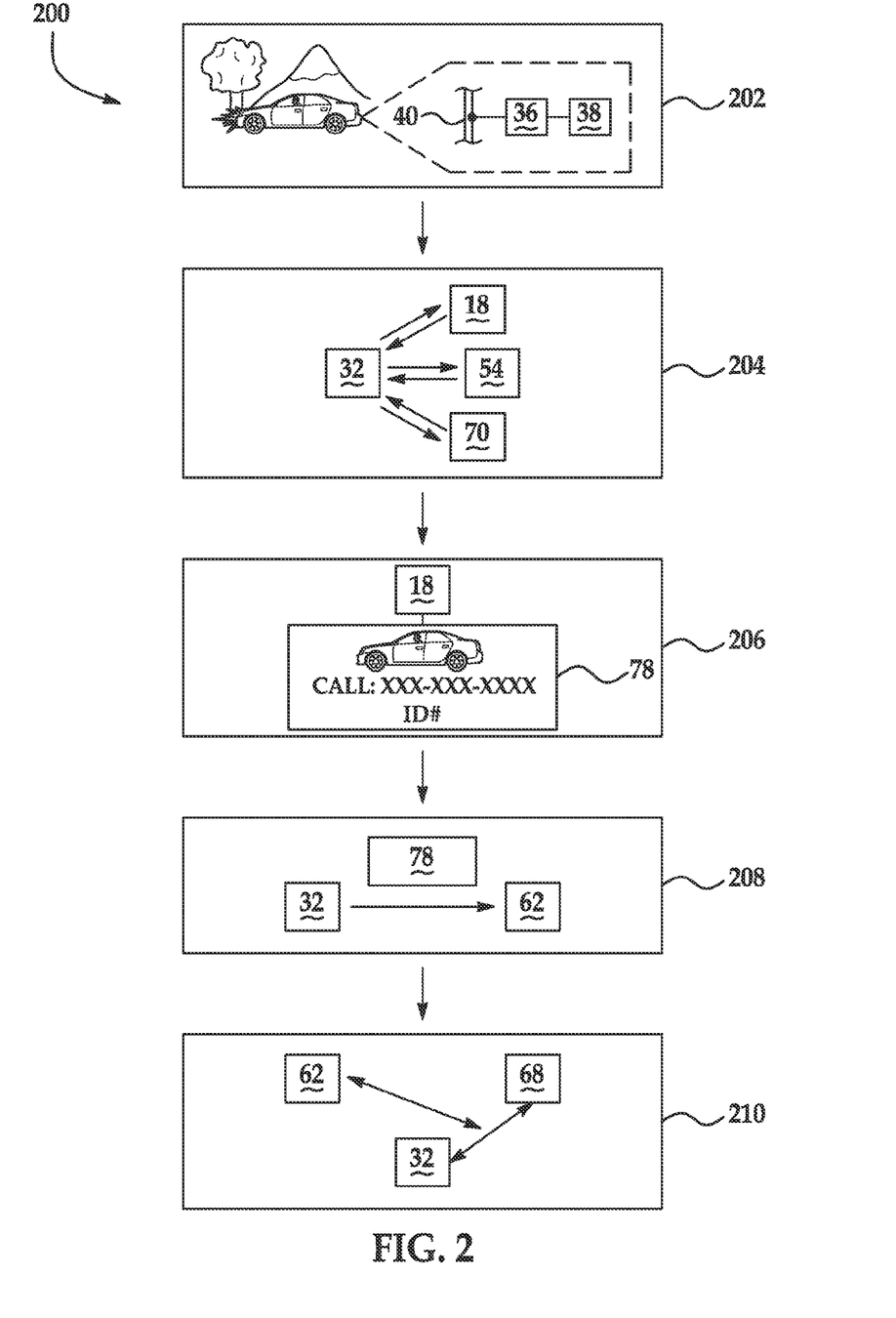
FIG. 2 is a schematic flow diagram illustrating an example of the vehicle incident response method.

Referring now to FIG. 2, an example of the method 200 is depicted. In this example, the sensor(s) 38 detect that the vehicle 12 has been involved in an incident. This is shown at box 202 of FIG. 2. The vehicle bus 40 receives signal(s) from the sensor interface module 36, and transmits these signal(s) to the in-vehicle communications system 32.

At box 204, the in-vehicle communications system 32 (via the application 56) then attempts to retrieve ICE contact information from one or more of the mobile communications device 18, the in-vehicle memory 54, and/or the off-board vehicle account stored in the database 70 at the remote advisor center 14. As mentioned above, the application 56 may be programmed to attempt to retrieve ICE contact information from one of the listed sources, or from two or more of the listed sources in some pre-programmed order if ICE contact information cannot be found in one or more of the listed sources. Examples of the pre-programmed order include the memory 54, and then the device 18 if necessary, and then the off-board account if necessary; or the device 18, and then the memory 54 if necessary, and then the off-board account if necessary.

In one example, the mobile communications device 18 and the in-vehicle communications system 32 establish the short range communication link 30 when the occupant enters the vehicle 12 and both the device 18 and system 32 are turned on. Generally, this would occur prior to the incident taking place and prior to its recognition (i.e., prior to box 202). In this example, the application 56 may immediately request to access the device's memory 54', search the memory 54' for ICE contact information, and if the ICE contact information is available, retrieve the information and temporarily store the information on the in-vehicle memory 54. The temporary storage of the ICE contact information in the in-vehicle memory 54 allows the application 56 to retrieve the ICE contact information from the memory 54 in response to the incident recognition without having to again access to the mobile communications device 18 after the incident has occurred. As such, in this example, in response to incident recognition, the application 56 retrieves the ICE contact information from the memory 54.

In another example, the mobile communications device 18 and the in-vehicle communications system 32 also establish the short range communication link 30 when the occupant enters the vehicle 12 and both the device 18 and system 32 are turned on. Unlike the previous example however, the application 56 in this example may be programmed to request to access the device's memory 54' after the incident has been recognized. Upon gaining access, the processor 52 searches the memory 54' for ICE contact information, and if the information is available, retrieves the information for inclusion in the subsequently generated electronic message 78 (shown in box 206).

In still another example, the application 56 may search the memory 54 for ICE contact information. The memory 54 may have an in-vehicle address book or contact list stored therein. In some examples, the application 56 may be programmed to search this source first, at least in part because if the information is available, the application 56 will not have to gain access to a non-vehicle device (e.g., mobile communications device 18 and/or off-board account). If the ICE contact information is available, the application 56 will retrieve the information for inclusion in the subsequently generated electronic message 78 (shown in box 206).

In yet another example, the application 56 may search for ICE contact information in the off-board account for the vehicle 12, which is stored in the remote advisor center database 70. In an example, the ICE contact information may be stored as part of the vehicle profile and/or as part of the vehicle owner profile. In some examples, the application 56 may be programmed to search this source last, in part because the application 56 will have to search outside the vehicle 12 to retrieve information that may stored in the vehicle 12 or in a device 18 located in the vehicle 12. If the ICE contact information is available, the application 56 will retrieve the information for inclusion in the subsequently generated electronic message 78 (shown in box 206).

It is to be understood that if, after accessing and searching the device 18, the memory 54, and/or the off-board account (in accordance with however the application 56 is programmed), no ICE contact information is available, the application 56 may be programmed to transmit an alert/notification to the server 44 indicating that an incident has occurred with the vehicle 12 and that no ICE contact information is available.

Still referring to the method 200 in FIG. 2, and in particular to box 206, after the ICE contact information is retrieved, the application 56 generates the electronic message 78. As mentioned above, the electronic message 78 is a text, MMS, or SMS message. In the example shown in FIG. 2, the electronic message 78 includes: information indicating to the recipient that the message 78 relates to the vehicle 12 (represented by the vehicle symbol), the call-in information (e.g., contact number represented by XXX-XXX-XXXX) for the recipient of the message 78 to call, and the vehicle incident identifier (represented by ID#) for recipient to use when calling the contact number. If this message 78 is transmitted with a link for the recipient to press on his/her device 62 to initiate the subsequent call to the remote advisor center 14, the vehicle incident identifier maybe present in the caller identification information that is transmitted to the communications device 62 when receiving the subsequent call from the recipient.

In this example, the application 56 then initiates the transmission of the electronic message 78 to the communications device 62 of the retrieved ICE contact. As previously discussed, the retrieved ICE contact information includes at least the name of the contact and a phone number of the contact's communication device 62. In the examples disclosed herein, the communications device 62 may be any communications device that is capable of receiving text, MMS, or SMS messages.

As shown at box 208, the electronic message 78 is received at the communications device 62. The electronic message 78 may be displayed on the screen of that device 62. It is to be understood that the electronic message 78 is sent by the communications system 32, through the cellular chipset/component 46 and the vehicle bus 40, over the carrier/communication system 16.

While not shown in the example method 200 in FIG. 2, it is to be understood that in an example, the application 56 may also generate the previously described notification/alert, and transmit the notification to the remote advisor center server 44. Through processing by the server 44, the transmission of the notification/alert results in the assignment of an advisor 60, 60' to aid in responding to the incident, and also apprises that advisor 60, 60' that the ICE contact may later be patched into the call between himself/herself and the in-vehicle occupant(s). Transmission of the notification/alert also alerts the advisor 60, 60' that, if the vehicle 12 has not called, he/she should establish a wireless connection between his/her workstation 68 and the vehicle communications device 32, and thus also establish a conversation between himself/herself and any in-vehicle occupant(s). In this example, the advisor 60, 60' then initiates the voice call with the vehicle communications system 32.

If the vehicle 12 initiates a call to the remote advisor center 14 in response to the incident, the vehicle 12 may not transmit the notification/alert to the remote advisor center server 44. In this example, the vehicle 12 may transmit the vehicle incident identifier previously sent to the emergency contact to the advisor 60, 60' when making the call to the remote advisor center 14. The transmission of the vehicle incident identifier associates the call between the vehicle communications system 32 and the advisor 60, 60' with the vehicle incident identifier so that the communications module 64 may identify this call for subsequently linking in a calling emergency contact.

In response to receiving the electronic message 78, the ICE uses the call-in information (e.g., contact number) to call the remote advisor center 14. As previously described, the contact number is a general number, and the call is routed to the communications module 64. If no caller identification information is received that includes the vehicle incident identifier, the communications module 64 prompts the ICE contact to input the vehicle incident identifier (either verbally or through the keypad or touch screen). Whether retrieved from the caller identification information or the user input, the communications module 64 uses the vehicle incident identifier to identify an existing call between the vehicle communications system 32 and the telecommunications and computing equipment 68 of the advisor 60 or 60'. Upon identifying the existing/ongoing call, the communications module 64 patches the emergency contact into this call. The connection between the vehicle communications system 32, the telecommunications and computing equipment 68, and the emergency contact's communication device 62 is shown in box 210 of FIG. 2. The emergency contact may then participate in the conversation with the advisor 60, 60' and the in-vehicle occupant(s).

In the examples disclosed herein, the live advisor 60 on the line with the in-vehicle occupant(s) and the ICE contact may perform various tasks. In an example, the live advisor 60 may provide the ICE contact with information about the incident. This information may be based upon information received in the notification/alert and/or other information transmitted from the vehicle 12 (e.g., crash and/or collision data, time of the incident, location of the incident, etc.).

The communication between the emergency contact, the advisor 60, and the in-vehicle occupant(s) enables any in-vehicle occupants to talk directly to the advisor 60 and the ICE contact simultaneously. The presence of the ICE contact in the three-way communication may aid the advisor 60 in obtaining additional information that the in-vehicle occupant may not be capable of providing, due to his/her current condition/state (e.g., in and out of consciousness), the fact that he/she does not have such information in his/her presence (e.g., his/her medical history, doctor information, blood type, etc.), and/or the fact that he/she does not wish to speak to the advisor 60. The presence of the ICE contact in the three-way communication may also assist if a language barrier is present between the in-vehicle occupant(s) and the advisor 60.

The live advisor 60 may also contact emergency personnel 74 (e.g., police, fire, 911 operator, etc.) and provide any vehicle incident related information he/she has obtained.

Figure 3:
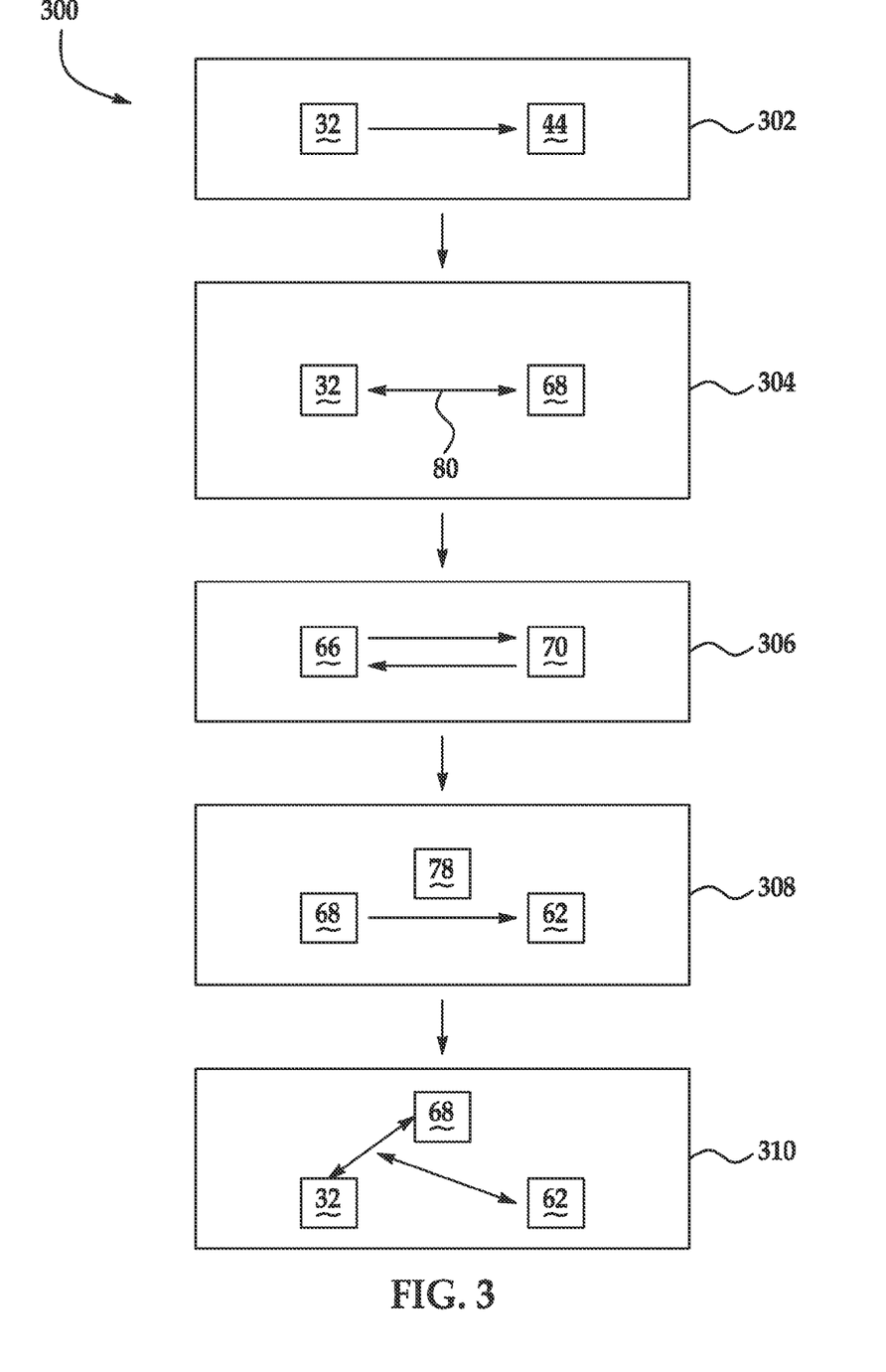
FIG. 3 is a schematic flow diagram illustrating another example of the vehicle incident response method.

Referring now to FIG. 3, another example of the method 300 is depicted. In this example of the method 300, the application 56 is not involved. Rather, some of the actions performed by the application 56 in the method 200 are performed, in this example, by the server 44 and the live advisor 60 and/or automated advisor 60'.

In this example of the method 300, a vehicle incident has occurred even though it is not illustrated. The vehicle bus 40 receives signal(s) from the sensor interface module 36, and transmits these signal(s) to the in-vehicle communications system 32, as shown in box 302.

In the example shown in FIG. 3, the in-vehicle communications system 32 transmits a notification/alert to the server 44, indicating that the vehicle 12 has been involved in an incident. Sensor information may also be included in this notification/alert. In response to receiving the notification/alert, the server 44 may be programmed to initiate a voice call to the vehicle 12. In an example, the server 44 is programmed to forward the notification to a workstation of an available live advisor 60 with an instruction for the advisor 60 to attempt to contact the vehicle 12. In another example, the server 44 is programmed to instruct an automated advisor 60' to initiate a voice call to the vehicle 12.

While not shown, in another example of the method 300, the vehicle 12 may initiate the voice call with the advisor 60, 60'. In this example, the vehicle 12 may transmit the notification/alert information (including, for example, the vehicle incident identifier) as caller identification information along with the voice call. This information will be available to the advisor 60, 60' so that he/she or it can link the call with the vehicle incident identifier.

The voice call between the telecommunications and computing equipment 68 of the advisor 60 or 60' and the vehicle communications system 32 is shown at reference numeral 80 in box 304.

In one example, when the voice call 80 is established between the communications equipment 68 at the remote advisor center 14 and the in-vehicle communications system 32 at the vehicle 12, the advisor 60 or 60' may request an in-vehicle occupant to respond verbally. The live advisor 60 may attempt to talk to the in-vehicle occupant. The automated advisor 60' can play a pre-recorded message requesting a reply from the in-vehicle occupant(s). In some examples, a verbal response is not received from the in-vehicle occupant(s). If a verbal response is received, the advisor 60, 60' may ask the in-vehicle occupant who he or she would like the advisor 60, 60' to contact.

If the in-vehicle occupant does not respond or does not provide emergency contact information verbally, the advisor 60 or 60' retrieves ICE contact information for the vehicle 12 using the off-board account saved in the database 70 of the remote advisor center 14. The advisor 60 or 60' maintains the voice call with the vehicle 12 while retrieving the ICE contact information. The advisor 60 will instruct the processor 66 (e.g., at his/her workstation/computer equipment 68) to open the vehicle account/profile and retrieve any ICE contact information contained therein. The automated advisor 60' may be programmed to instruct the processor 66 (e.g., at the associated workstation/computer equipment 68) to open the vehicle account/profile and retrieve any ICE contact information contained therein. The processor 66 accessing the database 70, and the retrieval of ICE contact information from the database 70 is shown in box 306.

After retrieving the ICE contact information (either from the in-vehicle occupant or using the database 70), the information may be displayed to the live advisor 60 on his/her workstation. The processor 66 may generate the electronic message 78 and provide the live advisor 60 with the option to initiate the transmission of the electronic message 78 to the communications device 62 of the retrieved ICE contact. As previously discussed, the electronic message 78 includes the call-in information (e.g., contact number represented by XXX-XXX-XXXX) for the recipient of the message 78 to call, and the vehicle incident identifier (represented by ID#) for the recipient to use when calling the contact number. The advisor 60 elects to transmit the message 78, and the communication components of the remote advisor center 14 send the message 78 to the communications device 62 of the emergency contact, as shown at box 308.

When the automated advisor 60' is being used, the automated advisor 60' may automatically initiate the generation and transition of the electronic message 78. The automated advisor 60' may also be programmed to inform the in-vehicle occupant(s), through a pre-recorded message, the name of the ICE contact that is being transmitted the electronic message 78.

As shown at box 308, the electronic message 78 is received at the communications device 62. The electronic message 78 may be displayed on the screen of that device 62. It is to be understood that the electronic message 78 is sent by the communications module 64 over the carrier/communication system 16.

In response to receiving the electronic message 78, the emergency/ICE contact uses the call-in information (e.g., contact number) to call the remote advisor center 14. As previously described, the contact number is a general number, and the call is routed to the communications module 64. If no caller identification information is received that includes the vehicle incident identifier, the communications module 64 prompts the ICE contact to input the vehicle incident identifier (either verbally or through the keypad or touch screen). Whether retrieved from the caller identification information or the user input, the communications module 64 uses the vehicle incident identifier to identify an existing call between the vehicle communications system 32 and the telecommunications and computing equipment 68 of the advisor 60 or 60'. Upon identifying the existing/ongoing call, the communications module 64 patches the emergency contact into this call. The connection between the vehicle communications system 32, the telecommunications and computing equipment 68, and the emergency contact's communication device 62 is shown in box 310 of FIG. 3. The emergency contact may then participate in the conversation with the advisor 60, 60' and the in-vehicle occupant(s).

In any of the examples disclosed herein, when an automated advisor 60' is part of the call, the advisor 60' may also provide the call participants (e.g., in-vehicle occupant(s) and the emergency/ICE contact) with the option of switching from the automated advisor 60' to a live advisor 60. This may be done through a pre-recorded message and a verbal response/input by either the in-vehicle occupant or the ICE contact on the call.

As previously described in reference to FIG. 3, the call enables any in-vehicle occupants to talk directly to the advisor 60 or 60' and the ICE contact simultaneously. In addition, the live advisor 60 may also contact emergency personnel 74 (e.g., police, fire, 911 operator, etc.) and provide any vehicle incident related information he/she has obtained. Still further, the automated advisor 60' may also contact emergency personnel 74 (e.g., police, fire, 911 operator, etc.) and provide (through pre-recorded message(s)) any vehicle incident related information that has been retrieved.

In the examples of the method 200, 300 and system 10 disclosed herein, the vehicle 12 automatically initiates a response method in order to contact the ICE contact of an in-vehicle occupant after a vehicle incident.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. In a method that detects a vehicle incident, and responds to the vehicle incident with (i) a communication to a remote advisor center that establishes a wireless connection between the remote advisor center and a vehicle associated with the vehicle incident and a conversation between an advisor at the remote advisor center and an occupant of the vehicle, and (ii) a message to an emergency contact, an improvement to the method comprising:
by a processor of an in-vehicle communications system running an application resident on an in-vehicle memory:
performing a string search of i) a memory of a mobile communications device paired with the in-vehicle communications system, ii) the in-vehicle memory, or iii) an off-board account associated with the vehicle to retrieve information of an emergency contact of the occupant of the vehicle; and
including in the message to the emergency contact, call-in information associated with the vehicle incident;
receiving a call at the remote advisor center from the emergency contact using the call-in information;
using information provided by or through the call, determining that the call is associated with the vehicle incident; and
connecting the emergency contact into the conversation between the advisor and the occupant of the vehicle.

2. The improvement to the method as defined in claim 1, further comprising:
recognizing, by an in-vehicle bus, that the vehicle incident has occurred;
wherein in response to the recognizing, the in-vehicle communications system, which is connected to the in-vehicle bus, performs the string search;
by the processor, generating the message including vehicle incident information and the call-in information; and
transmitting the message to a communications device of the emergency contact.

3. The improvement to the method as defined in claim 2 wherein the message is transmitted from the in-vehicle communications system, and wherein the method further comprises transmitting, from the in-vehicle communications system, an alert to a communications device of the remote advisor center indicating that the message has been sent to the communications device of the emergency contact.

4. The improvement to the method as defined in claim 1 wherein the call-in information includes a general phone number and a vehicle incident identifier.

5. The improvement to the method as defined in claim 4, further comprising:
after receiving the call at the remote advisor center from the emergency contact, prompting the emergency contact to provide the vehicle incident identifier; and
using the vehicle incident identifier to connect the emergency contact into the conversation between the advisor and the occupant of the vehicle.

6. The improvement to the method as defined in claim 4, further comprising:
receiving caller identification information along with the call, the caller identification information including the vehicle incident identifier; and
using the vehicle incident identifier to connect the emergency contact into the conversation between the advisor and the occupant of the vehicle.

7. The improvement to the method as defined in claim 1, further comprising transmitting vehicle incident information to an emergency personnel.

8. The improvement to the method as defined in claim 1 wherein the message is a text message or a short message service (SMS) message or a multimedia messaging service (MMS) message.

9. The improvement to the method as defined in claim 1 wherein the call-in information is stored in the in-vehicle memory, and wherein the method further comprises:
receiving updated call-in information at the in-vehicle communications system; and
replacing, in the in-vehicle memory, a previously stored call-in information with the updated call-in information.

10. The improvement to the method as defined in claim 1, further comprising:
recognizing, by an in-vehicle bus, that the vehicle incident has occurred;
establishing the wireless connection in response to recognizing the vehicle incident; and
while the wireless connection is in progress:
the processor at the remote advisor center performing the string search to retrieve the information of the emergency contact of the occupant of the vehicle;
generating, by the processor at the remote advisor center, the message; and
transmitting, by a communications module operatively connected to the processor at the remote advisor center, the message to a communications device of the emergency contact.

11. In a method that detects a vehicle incident, and responds to the vehicle incident with (i) a communication to a remote advisor center that establishes a wireless connection between the remote advisor center and a vehicle associated with the vehicle incident and a conversation between an advisor at the remote advisor center and an occupant of the vehicle, and (ii) a message to an emergency contact, an improvement to the method comprising:
- recognizing, by an in-vehicle bus and a sensor connected thereto, that the vehicle incident has occurred;
- establishing the wireless connection in response to recognizing the vehicle incident; and
- while the wireless connection is in progress:
  - retrieving, by a processor at the remote advisor center, information of the emergency contact from an off-board account associated with the vehicle using a string search;
  - generating, by the processor at the remote advisor center, the message;
  - including in the message to the emergency contact, call-in information associated with the vehicle incident;
  - incorporating a vehicle incident identifier into the message; and
  - transmitting, by a communications module operatively connected to the processor at the remote advisor center, the message to a communications device of the emergency contact;
- receiving a call at the remote advisor center from the emergency contact using the call-in information;
- upon receiving the call at the remote advisor center, prompting the emergency contact to input the vehicle incident identifier;
- using the input vehicle incident identifier to identify the conversation between the advisor and the occupant of the vehicle; and
- connecting the emergency contact into the conversation between the advisor and the occupant of the vehicle.

12. A vehicle incident response system, comprising:
- a sensor of a vehicle that senses that a vehicle incident has occurred;
- an in-vehicle bus to recognize that the vehicle incident has occurred through signals received from the sensor;
- an in-vehicle communications system operatively connected to the in-vehicle bus, the in-vehicle communications system including:
  - a microprocessor;
  - a memory associated with the microprocessor; and
  - an application resident on the memory, the application including computer readable instructions for:
    - performing a string search of i) a memory of a mobile communications device paired with the in-vehicle communications system, ii) the memory, or iii) an off-board account associated with the vehicle to retrieve information of an emergency contact of an occupant of the vehicle; and
    - generating an electronic message including a vehicle incident identifier and call-in information to call to receive further information about the vehicle incident;
  - wherein the microprocessor is operable to transmit the electronic message to a communications device of the emergency contact; and
- a communications device of a vehicle remote advisor center operable to patch an incoming call from the communications device of the emergency contact with an existing call between an advisor communications device of the vehicle remote advisor center and the in-vehicle communications system.

13. The system as defined in claim 12, further comprising the mobile communications device paired with the in-vehicle communications system, the mobile communications device being selected from the group consisting of a smart phone, a tablet computer, and a laptop computer.

14. A vehicle incident response method, comprising:
- recognizing that an incident involving a vehicle has occurred;
- in response to the recognizing, retrieving information of an in case of emergency (ICE) contact from i) a memory of a mobile communications device paired with an in-vehicle communications system of the vehicle, ii) an in-vehicle memory, or iii) an off-board account associated with the vehicle;
- generating an electronic message including a vehicle incident identifier and call-in information for the ICE contact to call to receive further information about the incident; and
- transmitting the electronic message to a communications device of the ICE contact; and
- upon receiving a call from the communications device of the ICE contact, patching the call from the communications device into an existing call between the in-vehicle communications system and a communications device of a vehicle remote advisor center.

15. The vehicle response method as defined in claim 14 wherein the ICE contact is a contact of an in-vehicle occupant involved in the incident.

* * * * *